(No Model.) 3 Sheets—Sheet 1.

R. W. BLAZE.
GLASS MOLD.

No. 508,597. Patented Nov. 14, 1893.

WITNESSES  INVENTOR (No Model.) 3 Sheets—Sheet 2.

R. W. BLAZE.
GLASS MOLD.

No. 508,597. Patented Nov. 14, 1893.

WITNESSES
H. M. Corwin
W. B. Corwin

INVENTOR
Robert W. Blaze
by W. Bakewell Sons
his attorneys (No Model.) 3 Sheets—Sheet 3.

R. W. BLAZE.
GLASS MOLD.

No. 508,597. Patented Nov. 14, 1893.

WITNESSES

INVENTOR

Robert W. Blaze
by W. Bakewell & Sons
his attorneys

UNITED STATES PATENT OFFICE.

ROBERT W. BLAZE, OF PITTSBURG, PENNSYLVANIA.

GLASS-MOLD.

SPECIFICATION forming part of Letters Patent No. 508,597, dated November 14, 1893.

Application filed May 10, 1893. Serial No. 473,637. (No model.)

*To all whom it may concern:*

Be it known that I, ROBERT W. BLAZE, of Pittsburg, in the county of Allegheny and State of Pennsylvania, have invented a new and useful Improvement in Glass-Molds, of which the following is a full, clear, and exact description, reference being had to the accompanying drawings, forming part of this specification, in which—

Figure 1:
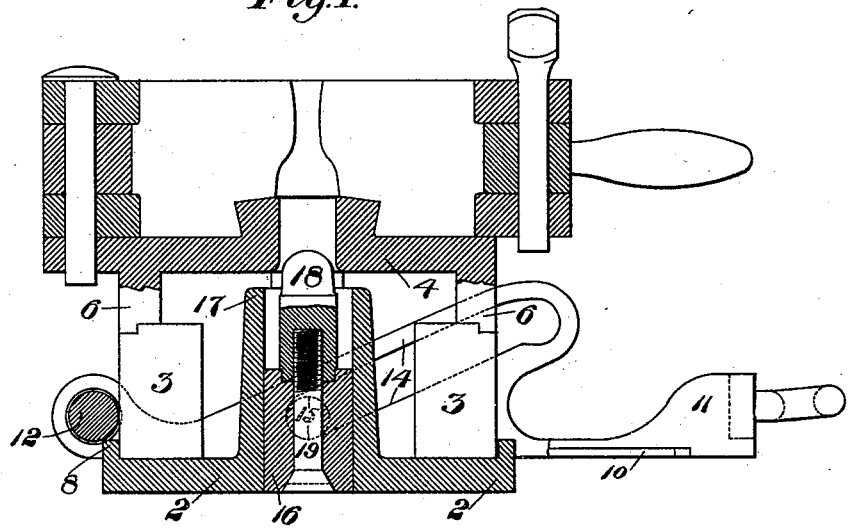
Figure 2:
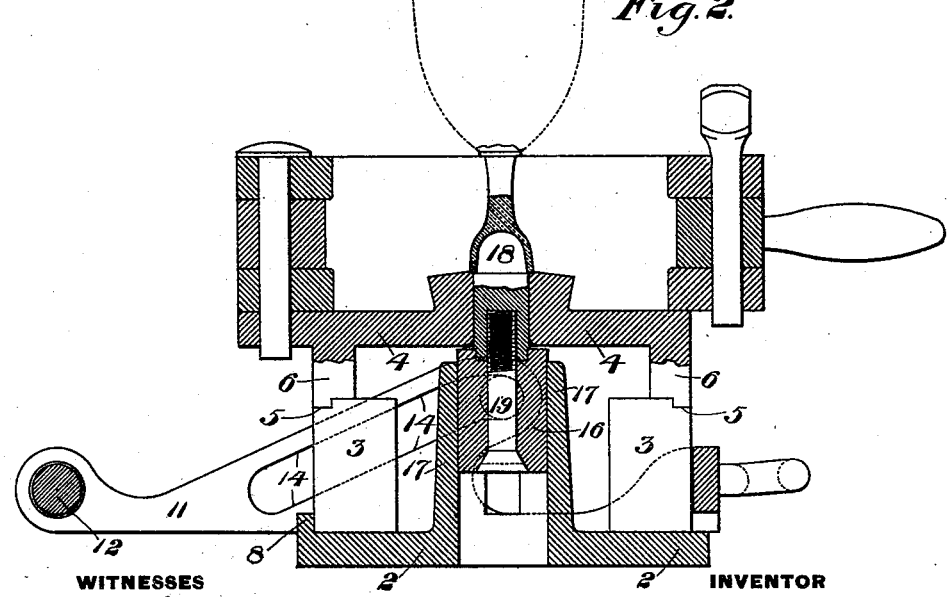
Figure 3:
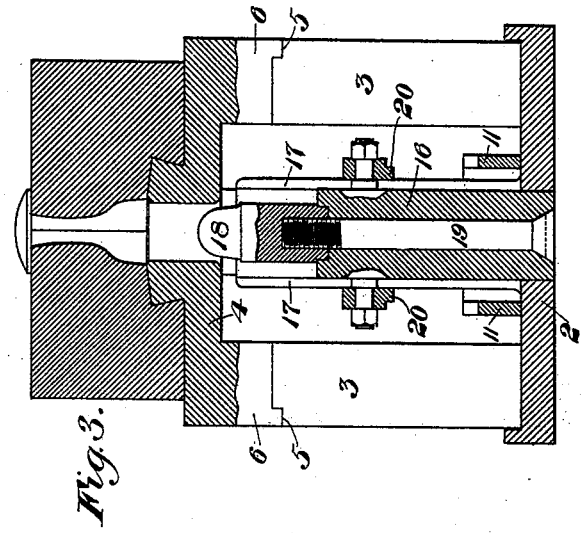
Figure 4:
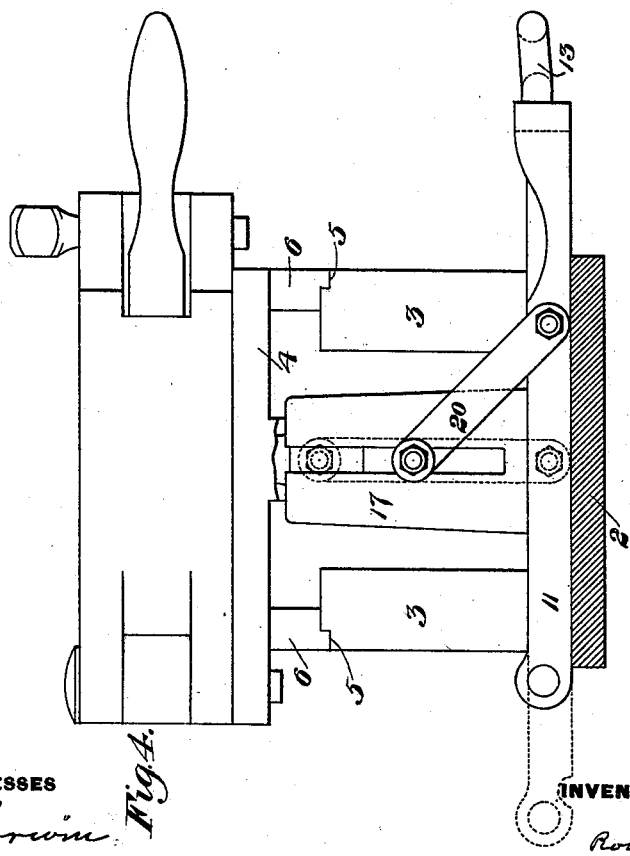
Figure 5:
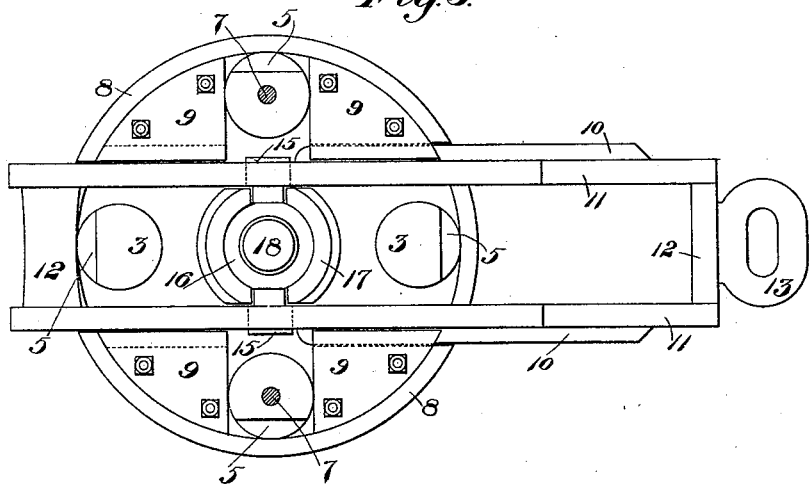
Figure 6:
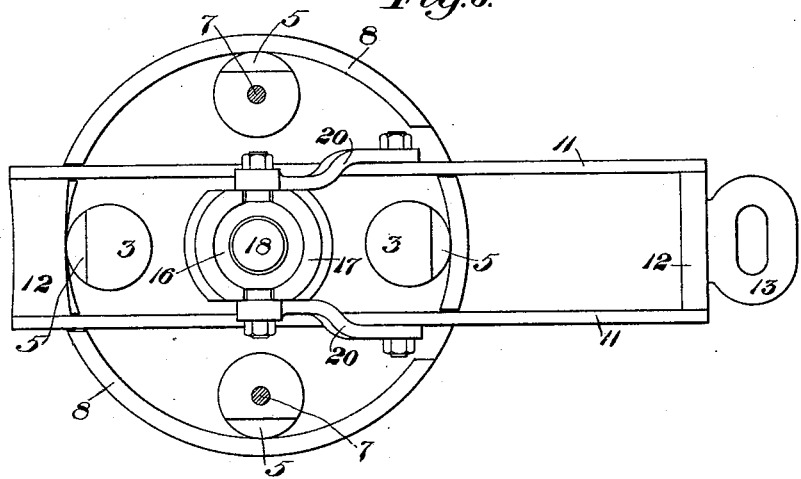

Figure 1 is a vertical sectional view of my improved cup-foot bottom, and Fig. 2 is a similar view, with the plunger raised. Fig. 3 is a cross-sectional view of a modified form; Fig. 4 being a side elevation of the same. Fig. 5 is a top plan view of the bottom of Fig. 1; and Fig. 6 is a similar view of the bottom of Fig. 4.

Like symbols of reference indicate like parts in each.

My invention relates to that class of glass molds wherein a hollow foot is formed upon cups or goblets, and is designed to produce a cup-foot bottom for the mold, which is more easily cooled than former devices and may be used with several molds, thus doing away with the necessity of making a bottom for each mold.

Heretofore the forming plug within the bottom has been cooled by a water circulation, but this is an expensive and intricate construction, and is done away with in my device, wherein the plug is lowered sufficiently so that the air may circulate around the same, or a blast of air be directed upon it, thus effectually cooling it.

In the drawings, 2 indicates the base of the cup-foot bottom, this base being preferably circular, and having posts 3 upon which the bottom-plate 4 of the mold rests so that the air has access to the plunger and guide-way. These posts are provided with recesses 5 into which suitable shoulders 6, upon the mold-plate 4, fit and cause the parts to register with each other. Bolts 7 are provided in two of these posts, which bolts pass through the plate of the mold and hold the same firmly in place. The upper face of the base 2 is recessed, leaving a projecting ring-portion 8, and in the recess are secured four plates 9, having parallel undercut edges forming guiding grooves for the lips 10 upon two slide-bars 11. These bars, 11, are rigidly secured together by two cross bars 12, at their ends, to one of which bars is secured the operating handle 13.

In the form of Figs. 1, 2 and 5, each bar is provided with an inclined cam slot 14 in which ride rollers 15 carried upon short shafts projecting from a plunger 16, which reciprocates within a cylindrical guideway or sleeve 17. This guideway is slotted at the sides to allow the movement of the short shafts, and as the slide-bars are reciprocated horizontally the rollers riding in the cam slots cause the plunger to rise and fall. To the plunger is secured a forming plug 18, by means of a screw 19 passing through the plunger and into the plug.

The action is as follows: A two-part hinged mold being placed upon and secured to the bottom and a forming plug of suitable size fastened to the plunger, the plunger is raised to its uppermost position as in Fig. 2, and the glass being dropped into the mold is pressed in the usual way. The plunger is then dropped as soon as possible into the position of Fig. 1, and the air at once cools the plug 18. If desired, a hose may be placed so as to direct a blast of air upon the plug, but this is not generally necessary. The mold is then opened, the cup removed, and the foot forced out into final shape.

In Figs. 3, 4 and 6 I illustrate a modified form of my invention, wherein the slide-bars 11 operate the plunger by means of links 20 pivoted to the bars and to the short shafts projecting from the plunger.

The advantages of my construction are apparent. The clumsy water-cooling system is done away with, as the plug is dropped sufficiently to allow access of air thereto through the open bottom, and a simple and cheap construction is attained for raising and lowering the same. Moreover, only one bottom is necessary for several molds as it is easily separable therefrom, and the forming plug may be changed to correspond with the mold.

Many variations may be made in the form and arrangement of the parts without departure from my invention, since I consider myself the first to lower the plug sufficiently to allow access of air thereto, and also the first to make a separable bottom.

I claim—

1. An open cup-foot bottom having a reciprocating plunger, and means for lowering the plunger sufficiently to allow access of air thereto; substantially as described.

2. An open cup-foot bottom having separated standards, and means for detachably securing a mold to said standards; substantially as described.

3. An open cup-foot bottom having a vertical guideway, a plunger movable therein, and horizontal slide-bars exterior to the guideway and connected to the plunger; substantially as described.

4. An open cup-foot bottom having a guideway, a plunger fitting within said guideway, and a forming plug detachably secured to the upper end of said plunger.

5. An open cup-foot bottom having a cylindrical guideway, a plunger having rollers projecting through said guideway, and slide-bars having cam slots within which said rollers ride; substantially as described.

6. The combination with a mold, of an open bottom detachably secured thereto, a plunger arranged to reciprocate within the bottom and having a plug removably secured thereto, and slide-bars connected to said plunger; substantially as described.

In testimony whereof I have hereunto set my hand.

ROBERT W. BLAZE.

Witnesses:
W. B. CORWIN,
H. M. CORWIN.